(12) United States Patent
Meng et al.

(10) Patent No.: US 10,944,958 B2
(45) Date of Patent: Mar. 9, 2021

(54) METHOD AND DEVICE FOR DETECTING HEIGHT-LIMITING ROD, AND AUTOMATIC DRIVING SYSTEM

(71) Applicant: Beijing Smarter Eye Technology Co. Ltd., Beijing (CN)

(72) Inventors: Ran Meng, Beijing (CN); Zhipeng Xiao, Beijing (CN); Hua Chai, Beijing (CN); Haifeng Lai, Beijing (CN); Zhe Wang, Beijing (CN); Jixia Du, Beijing (CN); Zunying Pang, Beijing (CN)

(73) Assignee: Beijing Smarter Eye Technology Co. Ltd., Beijing (CN)

( * ) Notice: Subject to any disclaimer, the term of this patent is extended or adjusted under 35 U.S.C. 154(b) by 0 days.

(21) Appl. No.: 16/585,748

(22) Filed: Sep. 27, 2019

(65) Prior Publication Data
US 2020/0304774 A1    Sep. 24, 2020

(30) Foreign Application Priority Data

Mar. 18, 2019  (CN) .......................... 201910203757.3

(51) Int. Cl.
*G08G 1/0967*   (2006.01)
*G06K 9/46*     (2006.01)
(Continued)

(52) U.S. Cl.
CPC ......... *H04N 13/271* (2018.05); *G05D 1/0094* (2013.01); *G05D 1/0251* (2013.01);
(Continued)

(58) Field of Classification Search
CPC ......... H04N 13/271; G06T 7/85; G06T 7/593; G06T 7/70; G06T 2207/10021;
(Continued)

(56) References Cited

U.S. PATENT DOCUMENTS

| 6,587,787 B1 * | 7/2003 | Yokota .................. G01C 21/36 701/455 |
| 2013/0222592 A1 * | 8/2013 | Gieseke ........... G08G 1/096708 348/148 |

(Continued)

*Primary Examiner* — Howard D Brown, Jr.
(74) *Attorney, Agent, or Firm* — Novick, Kim & Lee, PLLC; Allen Xue

(57) ABSTRACT

The present disclosure provides a method and a device for detecting a height-limiting rod, and an automatic driving system, for use in a binocular stereo camera. The method includes: filtering out invalid points in a disparity map corresponding to a target image in accordance with a predetermined detection range, so as to acquire a valid point disparity map; projecting the valid point disparity map along an X-axis direction in a three-dimensional coordinate system onto a plane where a Y axis and a Z axis are located, and counting the quantity of valid points for each row of pixels with respect to each disparity value, so as to acquire a projection image; filtering out invalid projection points and invalid blobs in the projection image, so as to acquire a valid blob image; and back-projecting the valid blob image to the three-dimensional coordinate system, and determining a rectangular region where the height-limiting rod is located in accordance with X-axis, Y-axis and Z-axis coordinate values.

10 Claims, 5 Drawing Sheets

(51) Int. Cl.

| | | |
|---|---|---|
| *H04N 13/271* | (2018.01) | |
| *G06T 7/80* | (2017.01) | |
| *G06T 7/593* | (2017.01) | |
| *G06T 7/70* | (2017.01) | |
| *G05D 1/00* | (2006.01) | |
| *G05D 1/02* | (2020.01) | |
| *G06K 9/00* | (2006.01) | |

(52) U.S. Cl.
CPC .......... *G06K 9/00201* (2013.01); *G06T 7/593* (2017.01); *G06T 7/70* (2017.01); *G06T 7/85* (2017.01); *G06T 2207/10021* (2013.01); *G06T 2207/10028* (2013.01)

(58) Field of Classification Search
CPC ........ G06T 2207/10028; G05D 1/0094; G05D 1/0251; G06K 9/00201; G06K 9/00805
See application file for complete search history.

(56) References Cited

U.S. PATENT DOCUMENTS

| 2014/0341464 A1* | 11/2014 | Fan | G06T 5/008 |
| | | | 382/154 |
| 2017/0019655 A1* | 1/2017 | Mueller | H04N 13/128 |
| 2020/0109954 A1* | 4/2020 | Li | G01C 21/32 |

* cited by examiner

METHOD AND DEVICE FOR DETECTING HEIGHT-LIMITING ROD, AND AUTOMATIC DRIVING SYSTEM

TECHNICAL FIELD

The present disclosure relates to the field of automatic driving, in particular to a method and a device for detecting a height-limiting rod, and an automatic driving system.

BACKGROUND

Recently, such accidents where vehicles having a relatively large height, e.g., buses, trucks or caravans, collide with a height-limiting rod happen frequently, resulting in casualties and property losses. There is no agreed standard about shapes, colors and materials of the height-limiting rod, so the following problems occur. 1) Visual image identification depends on a comprehensive sample database and an excellent classifier, so it is impossible to detect the height-limiting rod through the visual image identification. 2) When a relatively thin height-limiting rod is detected through such a sensor as a laser/millimeter-wave radar, the resultant reliability is insufficient.

In view of the above, the present disclosure has been proposed.

SUMMARY

An object of the present disclosure is to provide a method and a device for detecting a height-limiting rod, and an automatic driving system, so as to facilitate the detection of the height-limiting rod as compared with the related art.

In one aspect, the present disclosure provides in some embodiments a method for detecting a height-limiting rod for use in a binocular stereo camera, including: filtering out invalid points in a disparity map corresponding to a target image in accordance with a predetermined detection range, so as to acquire a valid point disparity map; projecting the valid point disparity map along an X-axis direction in a three-dimensional coordinate system onto a plane where a Y axis and a Z axis are located, and counting the quantity of valid points for each row of pixels with respect to each disparity value, so as to acquire a projection image; filtering out invalid projection points and invalid blobs in the projection image, so as to acquire a valid blob image; and back-projecting the valid blob image to the three-dimensional coordinate system, and determining a rectangular region where the height-limiting rod is located in accordance with X-axis, Y-axis and Z-axis coordinate values.

In another aspect, the present disclosure provides in some embodiments a device for detecting a height-limiting rod for use in a binocular stereo camera, including: a first filtration module configured to filter out invalid points in a disparity map corresponding to a target image in accordance with a predetermined detection range, so as to acquire a valid point disparity map; a projection module configured to project the valid point disparity map along an X-axis direction in a three-dimensional coordinate system onto a plane where a Y axis and a Z axis are located, and count the quantity of valid points for each row of pixels with respect to each disparity value, so as to acquire a projection image; a second filtration module configured to filter out invalid projection points and invalid blobs in the projection image, so as to acquire a valid blob image; and a determination module configured to back-project the blob image to the three-dimensional coordinate system, and determine a rectangular region where the height-limiting rod is located in accordance with X-axis, Y-axis and Z-axis coordinate values.

In yet another aspect, the present disclosure provides in some embodiments an automatic driving system including the above-mentioned device for detecting a height-limiting rod.

According to the embodiments of the present disclosure, information about an obstacle in a space may be acquired on the basis of binocular vision, and the resultant image may be processed so as to determine whether there is the height-limiting rod within the predetermined detection range. At a region where the height-limiting rod is located, information about a distance between the height-limiting rod and a vehicle may be calculated in accordance with the disparity value. As a result, it is able to facilitate the subsequent warning or braking operation, i.e., send alarm information to a driver or brake the vehicle.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
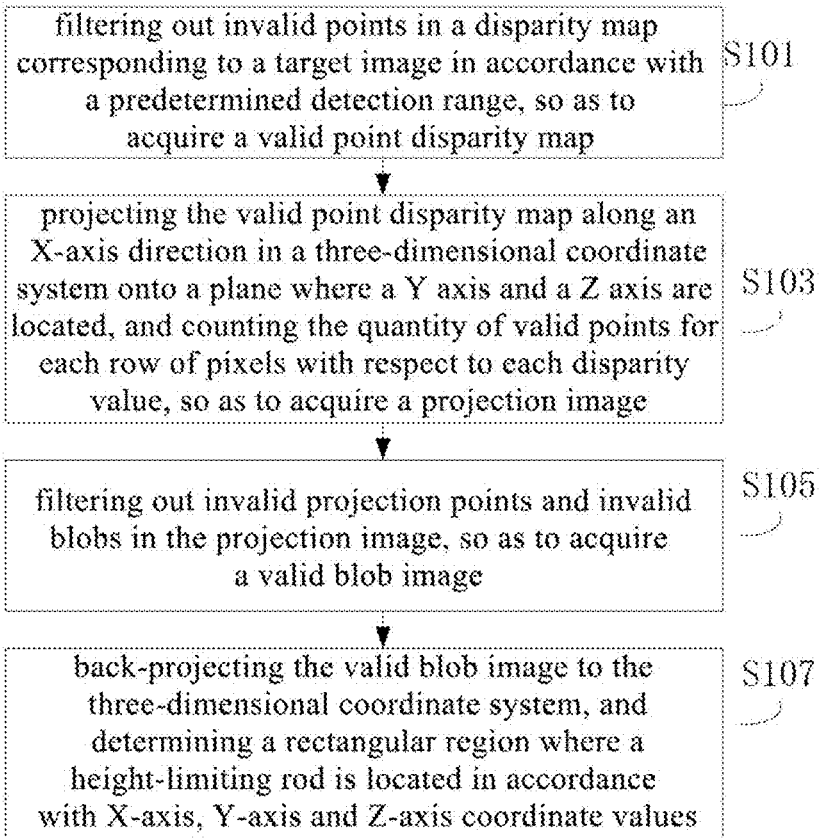
FIG. 1 is a flow chart of a method for detecting a height-limiting rod according to one embodiment of the present disclosure.

The present disclosure provides in some embodiments a method for detecting a height-limiting rod which, as shown in FIG. 1, includes: S101 of filtering out invalid points in a disparity map corresponding to a target image in accordance with a predetermined detection range, so as to acquire a valid point disparity map; S103 of projecting the valid point disparity map along an X-axis direction in a three-dimensional coordinate system onto a plane where a Y axis and a Z axis are located, and counting the quantity of valid points for each row of pixels with respect to each disparity value, so as to acquire a projection image; S105 of filtering out invalid projection points and invalid blobs in the projection image, so as to acquire a valid blob image; and S107 of back-projecting the valid blob image to the three-dimensional coordinate system, and determining a rectangular region where the height-limiting rod is located in accordance with X-axis, Y-axis and Z-axis coordinate values.

Figure 2:
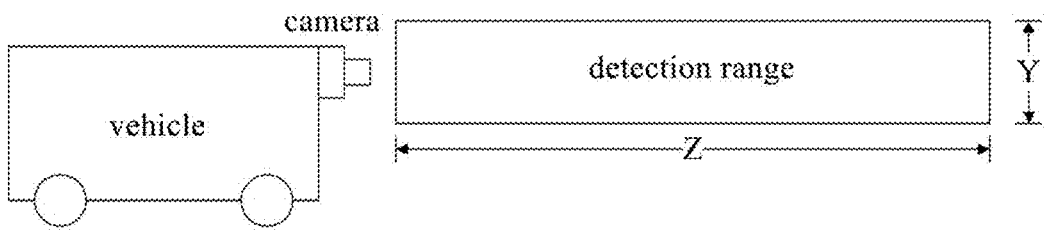
FIG. 2 is a schematic view showing a height-limiting detection range according to one embodiment of the present disclosure.

In S101, the invalid points in the disparity map corresponding to the target image may be filtered out in accordance with the predetermined detection range, so as to acquire the valid point disparity map. Different detection ranges may be provided for different vehicle types, and the predetermined detection range may include a distance detection range, width detection range, or a height detection range, as shown in FIG. 2. The width detection range needs to include a width of a vehicle body. For the height detection range, its upper limit needs to be greater than a maximum height of the vehicle body, and its lower limit may be set according to the practical need. The distance detection range may be set in accordance with a valid detectable distance of the binocular camera, and usually the distance may be 30 m. The predetermined detection range may be determined as mentioned above, and then the target image may be processed in accordance with the predetermined detection range, so as to filter out the invalid points in the disparity map corresponding to the target image, thereby to acquire the valid point disparity map.

To be specific, for each pixel, an abscissa value range and an ordinate value range corresponding to each disparity value may be calculated in accordance with the predetermined detection range and a disparity value range corresponding to the predetermined detection range.

Figure 3:
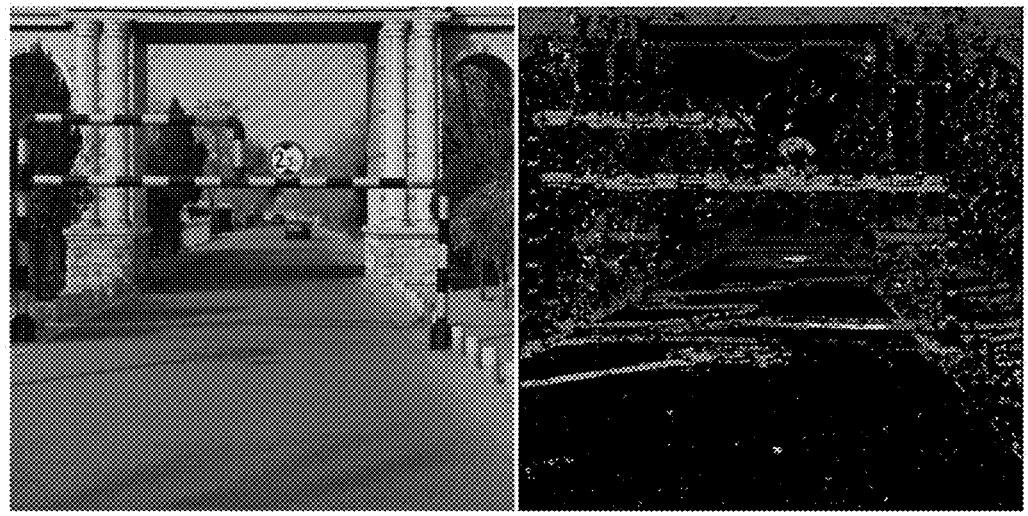
FIG. 3 shows an original image acquired by a binocular camera and a disparity map corresponding to the original image according to one embodiment of the present disclosure.

In FIG. 3, a left image is an original image acquired by the binocular camera, and a right image is a disparity map corresponding to the original image. In the disparity map with a black background (disparity values in the background are invalid), different grayscale values represent different disparity values.

Figure 4:
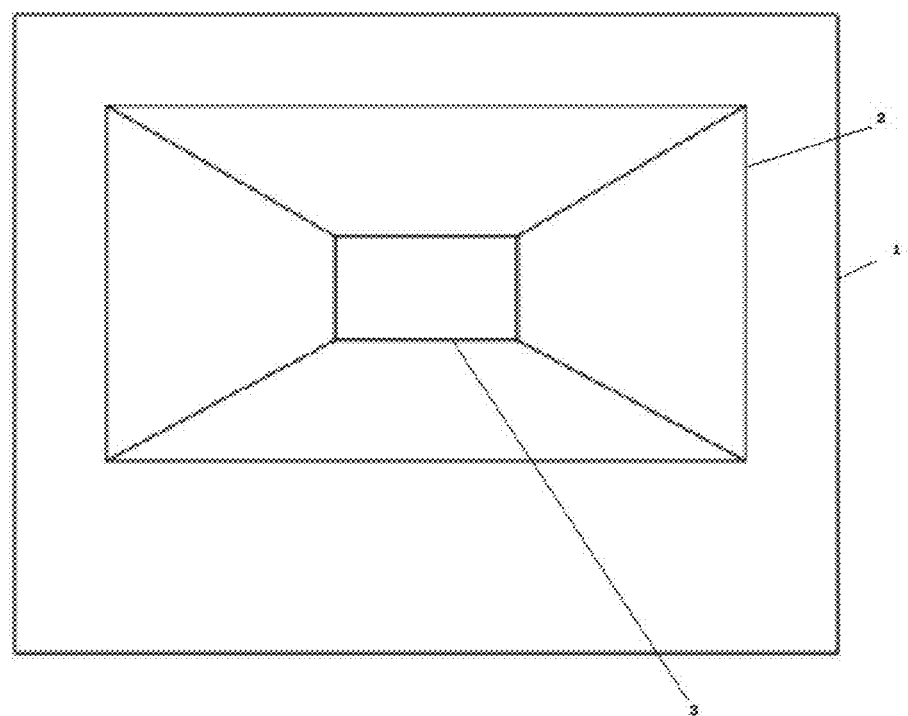
FIG. 4 is a schematic view showing a disparity value range corresponding to a predetermined detection range according to one embodiment of the present disclosure.

Within a same width detection range or a same height detection range, different sizes of image pixel detection ranges may be acquired for different disparity values. As shown in FIG. 4, a box 1 represents a boundary of the disparity map, a box 2 represents an image pixel detection range corresponding to a nearest position, i.e., a maximum disparity value, and a box 3 represents an image pixel detection range corresponding to a furthest position, i.e., a minimum disparity value. The different image range detection ranges should be smaller than the range indicated by the box 2 and greater than the range indicated by the box 3.

In a possible embodiment of the present disclosure, a predetermined lookup table may also be provided. In other words, during the initialization of a system, a lookup table may be established and include a correspondence among the abscissa value range for each pixel, the ordinate value range for each pixel, and whether a point corresponding to each pixel for different disparity values is a valid point, so as to improve the real-time calculation efficiency of the system.

Figure 5:
FIG. 5 shows a valid point disparity map after the filtration on the basis of the detection range according to one embodiment of the present disclosure.

Based upon the above, during the real-time calculation, the system may determine whether a point is located within the predetermined detection range required by the system in accordance with the disparity value, the abscissa value and the ordinate value of each pixel, so as to filter out the points beyond the predetermined detection range, thereby to acquire the valid point disparity map within the predetermined detection range. FIG. 5 shows the valid point disparity map acquired after filtering out the invalid points in FIG. 3 in accordance with a certain detection range.

In S103, the valid point disparity map acquired in S101 may be projected along the X-axis direction in the three-dimensional coordinate system onto the plane where the Y axis and the Z axis are located, and then the quantity of valid points for each row of pixels may be counted with respect to each disparity value, so as to acquire the projection image.

Figure 6:
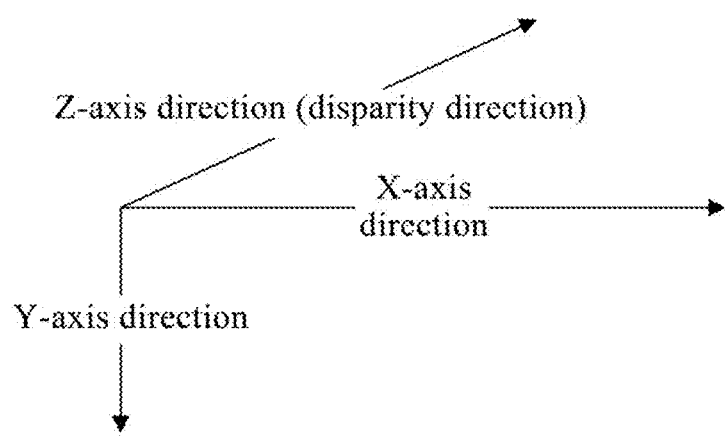
FIG. 6 is a schematic view showing a three-dimensional coordinate system according to one embodiment of the present disclosure.

To be specific, the three-dimensional coordinate system may be defined at first. A horizontal direction of the image may be defined as the X-axis direction, with a right part being positive, a longitudinal direction of the image may be defined as a Y-axis direction, with a lower part being positive, and a direction perpendicular to the plane where the Y axis and the Z axis are located may be defined as a Z-axis direction (i.e., a disparity direction), as shown in FIG. 6.

Figure 7:
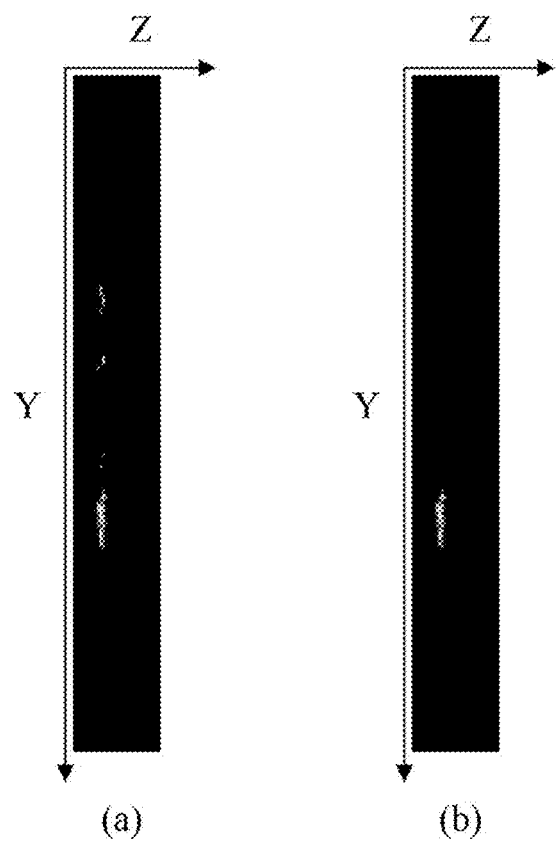
FIG. 7 shows an projection image and a valid blob image after the filtration according to one embodiment of the present disclosure.

The valid point disparity map may be projected along the X-axis direction in the three-dimensional coordinate system onto the plane where the Y axis and the Z axis are located, and then the quantity of valid points for each row of pixels may be counted with respect to each disparity value, so as to acquire the projection image. As shown in FIG. 7(*a*), different grayscale values represent different quantities of valid points, and a black background represents that the quantity of valid points is zero.

It should be appreciated that, for clarification, FIG. 7(*a*) shows a result of a part of regions in the disparity map in FIG. 5 after the projection.

In S105, the invalid projection points and the invalid blobs in the projection image may be filtered out, so as to acquire the valid blob image. To be specific, an appropriate quantity threshold may be set in accordance with the practical need. Usually, the smaller the disparity (the larger the distance), the smaller the quantity threshold, and the larger the disparity (the smaller the distance), the larger the quantity threshold. The projection image may be divided using the quantity threshold, so as to filter out the low-value projection points. In addition, prior to filtering out the invalid blobs, it is also necessary to subject the blobs to morphological treatment, e.g., expansion or closed-loop operation, in accordance with the practical need, so as to enhance information about the valid blobs. Hence, an appropriate width threshold, height threshold, area threshold or energy threshold may be set and selected for the blobs in accordance with the practical need, so as to filter out the invalid blobs. After filtering out the invalid blobs, when there are the valid blobs, it means that there is the height-limiting rod or any other height-limiting obstacle in the image detection range. FIG. 7(*b*) shows a result of the disparity map in FIG. 7(*a*) after filtering out the invalid projection points and the invalid blobs.

Figure 8:
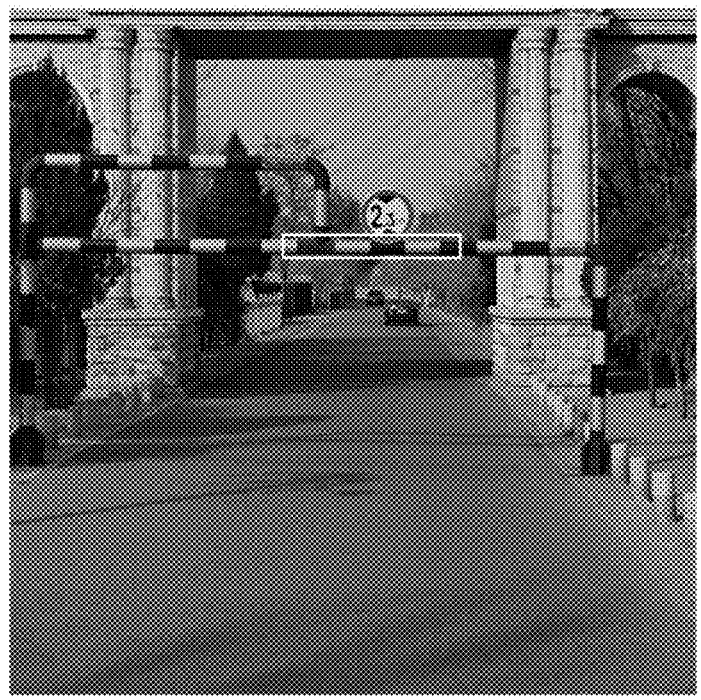
FIG. 8 is a schematic view showing a rectangular region (indicated by a white box) where the height-limiting rod is located in the original image according to one embodiment of the present disclosure.

In S107, the valid blob image may be back-projected to the three-dimensional coordinate system, and then the rectangular region where the height-limiting rod is located may be determined in accordance with the X-axis, Y-axis and Z-axis coordinate values. To be specific, the valid blob image acquired in S105 may be back-projected, with a Y-axis coordinate value of each blob in the projection image corresponding to a Y-axis coordinate value of a corresponding point on the height-limiting rod in the original image, and a Z-axis coordinate value (the disparity value) of the blob in the projection image corresponding to a distance between the corresponding point on the height-limiting rod and the camera. An X-axis coordinate value of each point on the height-limiting rod in the original image maybe determined in accordance with the width detection range. In this way, it is able to mark the rectangular region where the height-limiting rod is located in the original image, as shown in FIG. 8.

In a possible embodiment of the present disclosure, subsequent to determining the rectangular region where the height-limiting rod is located, the method may further include: calculating information about a distance between the height-limiting rod and the vehicle in accordance with the rectangular region and a corresponding disparity value; and triggering an alarm operation for the vehicle in accordance with the information, so as to send alarm information to a user.

According to the method in the embodiments of the present disclosure, information about an obstacle in a space may be acquired on the basis of binocular vision, and the resultant image may be processed so as to determine whether there is the height-limiting rod within the predetermined detection range. At a region where the height-limiting rod is located, information about the distance between the height-limiting rod and the vehicle may be calculated in accordance with the disparity value. As a result, it is able to facilitate the subsequent warning or braking operation, i.e., send alarm information to a driver or brake the vehicle.

Figure 9:
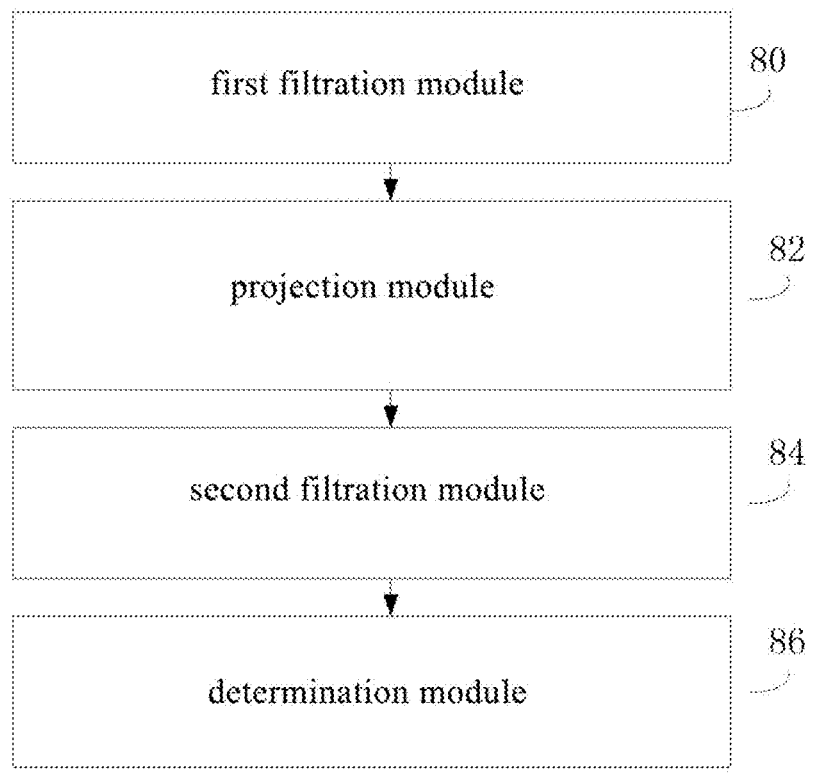
FIG. 9 is a schematic view showing a device for detecting the height-limiting rod according to one embodiment of the present disclosure.

The present disclosure further provides in some embodiments a device for detecting a height-limiting rod which, as shown in FIG. 9, includes: a first filtration module 80 configured to filter out invalid points in a disparity map corresponding to a target image in accordance with a predetermined detection range, so as to acquire a valid point disparity map; a projection module 82 configured to project the valid point disparity map along an X-axis direction in a three-dimensional coordinate system onto a plane where a Y axis and a Z axis are located, and count the quantity of valid points for each row of pixels with respect to each disparity value, so as to acquire a projection image; a second filtration module 84 configured to filter out invalid projection points and invalid blobs in the projection image, so as to acquire a valid blob image; and a determination module 86 configured to back-project the blob image to the three-dimensional coordinate system, and determine a rectangular region where the height-limiting rod is located in accordance with X-axis, Y-axis and Z-axis coordinate values.

In a possible embodiment of the present disclosure, the first filtration module 80 may include: a first calculation module (not shown) configured to calculate an abscissa value range and an ordinate value range for each pixel in the disparity map in accordance with the predetermined detection range; a judgment module configured to determine whether each point is located within the predetermined detection range in accordance with the disparity value, an abscissa value and an ordinate value of each point; and a first filtration sub-module (not shown) configured to filter out the invalid points in the disparity map in accordance with a judgment result, so as to acquire the valid point disparity map.

In a possible embodiment of the present disclosure, the first filtration module 80 may include: a second calculation module (not shown) configured to calculate an abscissa value range and an ordinate value range corresponding to each disparity value in accordance with the predetermined detection range and a disparity value range corresponding to the predetermined detection range; and a construction module (not shown) configured to construct a lookup table including a correspondence among the abscissa value range for each pixel, the ordinate value range for each pixel, and whether a point corresponding to each pixel for different disparity values is a valid point, and filter out the invalid points in the disparity image in accordance with the lookup table, thereby to acquire the valid point disparity image.

In a possible embodiment of the present disclosure, the second filtration module 84 may include: a comparison module (not shown) configured to compare a value of each point in the projection image with a predetermined quantity threshold, determine that the point is an invalid point when the value of the point is less than the predetermined quantity threshold, and filter out the invalid point; and a processing module (not shown) configured to subject each blob in the projection image to morphological treatment, compare a treatment result with a blob threshold, determine that the blob is an invalid blob when the treatment result is less than the blob threshold, and filter out the invalid blob.

The present disclosure further provides in some embodiments an automatic driving system which includes the above-mentioned device for detecting the height-limiting rod.

According to the embodiments of the present disclosure, based on a principle of binocular vision, a same target may be imaged through the binocular camera, and the disparity values of a target image may be calculated in real time, so as to acquire a size of a target space and a distance between the target and the vehicle. As compared with the visual image identification through a monocular camera, in the embodiments of the present disclosure, the visual image identification may not depend on a comprehensive sample database and an excellent classifier. In addition, as compared with information about a point cloud generated through a laser radar or a millimeter-wave radar, the point cloud generated in the embodiments of the present disclosure may be denser, so it is able to improve the detection reliability even in the case of a relatively thin height-limiting rod.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for detecting a height-limiting rod, for use in a binocular stereo camera, comprising:
   filtering out invalid points in a disparity map corresponding to a target image in accordance with a predetermined detection range, so as to acquire a valid point disparity map;
   projecting the valid point disparity map along an X-axis direction in a three-dimensional coordinate system onto a plane where a Y axis and a Z axis are located, and counting the quantity of valid points for each row of pixels with respect to each disparity value, so as to acquire a projection image;
   filtering out invalid projection points and invalid blobs in the projection image, so as to acquire a valid blob image; and back-projecting the valid blob image to the three-dimensional coordinate system, and determining a rectangular region where the height-limiting rod is located in accordance with X-axis, Y-axis and Z-axis coordinate values.

2. The method according to claim 1, wherein the filtering out the invalid points in the disparity map corresponding to the target image in accordance with the predetermined detection range so as to acquire the valid point disparity map comprises:
calculating an abscissa value range and an ordinate value range for each pixel corresponding to each disparity value in accordance with the predetermined detection range and a disparity value range corresponding to the predetermined detection range;
determining whether each point is located within the predetermined detection range in accordance with the disparity value, an abscissa value and an ordinate value of each point; and
filtering out the invalid points in the disparity map in accordance with a judgment result, so as to acquire the valid point disparity map.

3. The method according to claim 1, wherein the filtering out the invalid points in the disparity map corresponding to the target image in accordance with the predetermined detection range so as to acquire the valid point disparity map comprises:
calculating an abscissa value range and an ordinate value range for each pixel corresponding to each disparity value in accordance with the predetermined detection range and a disparity value range corresponding to the predetermined detection range; and
constructing a lookup table comprising a correspondence among the abscissa value range for each pixel, the ordinate value range for each pixel, and whether a point corresponding to each pixel for different disparity values is a valid point, and filtering out the invalid points in the disparity image in accordance with the lookup table, thereby to acquire the valid point disparity image.

4. The method according to claim 1, wherein the filtering out the invalid projection points and the invalid blobs in the projection image so as to acquire the valid blog image comprises:
comparing a value of each point in the projection image with a predetermined quantity threshold, determining that the point is an invalid point when the value of the point is less than the predetermined quantity threshold, and filtering out the invalid point; and
subjecting each blob in the projection image to morphological treatment, comparing a treatment result with a blob threshold, determining that the blob is an invalid blob when the treatment result is less than the blob threshold, and filtering out the invalid blob.

5. The method according to claim 1, wherein subsequent to determining the rectangular region where the height-limiting rod is located, the method further comprises:
calculating information about the height-limiting rod and a vehicle in accordance with the rectangular region and a corresponding disparity value; and
triggering a warning operation for the vehicle in accordance with the information, so as to send alarm information to a user.

6. A device for detecting a height-limiting rod for use in a binocular stereo camera, comprising:
a first filtration module configured to filter out invalid points in a disparity map corresponding to a target image in accordance with a predetermined detection range, so as to acquire a valid point disparity map;
a projection module configured to project the valid point disparity map along an X-axis direction in a three-dimensional coordinate system onto a plane where a Y axis and a Z axis are located, and count the quantity of valid points for each row of pixels with respect to each disparity value, so as to acquire a projection image;
a second filtration module configured to filter out invalid projection points and invalid blobs in the projection image, so as to acquire a valid blob image; and
a determination module configured to back-project the blob image to the three-dimensional coordinate system, and determine a rectangular region where the height-limiting rod is located in accordance with X-axis, Y-axis and Z-axis coordinate values.

7. The device according to claim 6, wherein the first filtration module comprises:
a first calculation module configured to calculate an abscissa value range and an ordinate value range for each pixel corresponding to each disparity value in accordance with the predetermined detection range and a disparity value range corresponding to the predetermined detection range;
a judgment module configured to determine whether each point is located within the predetermined detection range in accordance with the disparity value, an abscissa value and an ordinate value of each point; and
a first filtration sub-module configured to filter out the invalid points in the disparity map in accordance with a judgment result, so as to acquire the valid point disparity map.

8. The device according to claim 6, wherein the first filtration module comprises:
a second calculation module configured to calculate an abscissa value range and an ordinate value range for each pixel corresponding to each disparity value in accordance with the predetermined detection range and a disparity value range corresponding to the predetermined detection range; and
a construction module configured to construct a lookup table comprising a correspondence among the abscissa value range for each pixel, the ordinate value range for each pixel, and whether a point corresponding to each pixel for different disparity values is a valid point, and filter out the invalid points in the disparity image in accordance with the lookup table, thereby to acquire the valid point disparity image.

9. The device according to claim 6, wherein the second filtration module comprises:
a comparison module configured to compare a value of each point in the projection image with a predetermined quantity threshold, determine that the point is an invalid point when the value of the point is less than the predetermined quantity threshold, and filter out the invalid point; and
a processing module configured to subject each blob in the projection image to morphological treatment, compare a treatment result with a blob threshold, determine that the blob is an invalid blob when the treatment result is less than the blob threshold, and filter out the invalid blob.

10. An automatic driving system, comprising the device according to claim 6.

* * * * *